(12) United States Patent
Shih

(10) Patent No.: US 8,320,960 B2
(45) Date of Patent: Nov. 27, 2012

(54) DOCKING STATION AND COMPUTER SYSTEM USING THE DOCKING STATION

(75) Inventor: Hung-Lin Shih, Taipei (TW)

(73) Assignee: Azurewave Technologies, Inc., Taipei (TW)

(*) Notice: Subject to any disclaimer, the term of this patent is extended or adjusted under 35 U.S.C. 154(b) by 559 days.

(21) Appl. No.: 12/506,757

(22) Filed: Jul. 21, 2009

(65) Prior Publication Data

US 2011/0021247 A1 Jan. 27, 2011

(51) Int. Cl.
*H04B 1/38* (2006.01)
(52) U.S. Cl. ............... 455/557; 361/679.55; 710/303
(58) Field of Classification Search .................. 455/557, 455/444, 554.1, 422.1, 446; 708/100; 379/219; 180/167; 361/679.4, 679.21; 348/E7.081, 348/164, 373, 222.1, 370; 707/E17.01, 822; 704/E15.001, 275
See application file for complete search history.

(56) References Cited

U.S. PATENT DOCUMENTS

| 7,149,514 | B1* | 12/2006 | DePani et al. | 455/426.2 |
| 7,298,611 | B1* | 11/2007 | Carnevali | 361/679.55 |
| 2002/0032875 | A1* | 3/2002 | Kashani | 713/300 |
| 2004/0019724 | A1* | 1/2004 | Singleton et al. | 710/303 |
| 2005/0088620 | A1* | 4/2005 | Dwyer et al. | 353/15 |
| 2005/0120079 | A1* | 6/2005 | Anderson et al. | 709/203 |
| 2006/0061963 | A1* | 3/2006 | Schrum | 361/686 |
| 2006/0159158 | A1* | 7/2006 | Moore et al. | 375/130 |
| 2007/0275698 | A1* | 11/2007 | Kuiken et al. | 455/414.1 |
| 2008/0006752 | A1* | 1/2008 | Lee et al. | 248/309.1 |

* cited by examiner

*Primary Examiner* — Jean Gelin
*Assistant Examiner* — Mahendra Patel
(74) *Attorney, Agent, or Firm* — Houtteman Law LLC

(57) ABSTRACT

A docking station includes a casing, a socket and a plurality of peripheral interface devices. The casing includes a base and a cover, wherein the cover is pivotingly disposed on the base, openably and coverably, to form an appearance of a notebook computer. The socket is formed in a surface of the base for receiving a mobile communication device, and a high speed transmission interface is formed in a bottom of the socket. The plurality of peripheral interface devices is disposed on the casing and electrically connected with the high speed transmission interface. When the mobile communication device is placed in the socket, the mobile communication device is electrically connected with the high speed transmission interface and transmits signals with the plurality of peripheral interface devices. Basing on the structure, the present invention can ensure that mobile communication devices are convenient for operation.

3 Claims, 3 Drawing Sheets

DOCKING STATION AND COMPUTER SYSTEM USING THE DOCKING STATION

BACKGROUND OF THE INVENTION

1. Field of the Invention

The present invention relates to a docking station and computer system using the docking station, and more particularly to a docking station with peripheral interface devices and computer system using the docking station.

2. Description of Related Art

Recently, with the rapid development of 3C industry, computers and mobile phones have become essential tools in people's lives. The convenience of computers and mobile phones is quite important to people.

By now, mobile phones have more and more functions and amazing data operations, besides communication function. As far as smart phones are concerned, they have inbuilt operating systems, in other words, application software can be installed on or unloaded from smart phones randomly. Accordingly, smart phones can have the functions such as surfing the internet, receiving or sending emails, storing a large amount of data, playing audio and video files and so on, like a minicomputer, so that users can conveniently process and use various information anytime and anywhere.

However, since smart phones generally are small in size, they are inconvenient for operation and use relatively. For this reason, as long as users can stay in environments where they can use computers, data in smart phones are always transmitted into the computers so that users can execute related operation on the computers, and after operation, related data in the computers are transmitted into the smart phones for being used outside.

Accordingly, though smart phones are easy to carry so that users can conveniently process various information anytime and anywhere, users must store data in smart phones and computers separately, which causes inconvenience on operation and usage.

SUMMARY OF THE INVENTION

An object of the present invention is to provide a docking station and computer system using the docking station which can use operation functions of mobile communication devices as principal operation ways and effectively combine with peripheral interface devices so that users can actually operate and use the mobile communication devices via the peripheral interface devices, thereby using the mobile communication devices conveniently.

To achieve the above-mentioned object, a docking station in accordance with the present invention is provided. The docking station includes a casing, a socket and a plurality of peripheral interface devices. The casing includes a base and a cover, wherein the cover is pivotingly disposed on the base, operably and coverably, to form an appearance of a notebook computer. The socket is formed in a surface of the base for receiving a mobile communication device, and a high speed transmission interface is formed in a bottom of the socket. The plurality of peripheral interface devices is disposed on the casing and electrically connected with the high speed transmission interface. When the mobile communication device is placed in the socket, the mobile communication device is electrically connected with the high speed transmission interface and transmits signals with the plurality of peripheral interface devices.

To achieve the above-mentioned object, a docking station in accordance with the present invention is further provided. The docking station includes a casing, a high speed transmission interface and a plurality of peripheral interface devices. The casing includes a base and a cover, wherein the cover is pivotingly disposed on the base, openably and coverably, to form an appearance of a notebook computer. The high speed transmission interface is formed in a side surface of the base for being connected with a mobile communication device. The plurality of peripheral interface devices is disposed on the casing and electrically connected with the high speed transmission interface. When the mobile communication device is electrically connected with the high speed transmission interface, the mobile communication device transmits signals with the plurality of peripheral interface devices.

To achieve the above-mentioned object, a computer system in accordance with the present invention is further provided. The computer system includes a mobile communication device and a docking station. The mobile communication device is a principal operation device. The docking station includes a casing, a socket and a plurality of peripheral interface devices. The casing includes a base and a cover, wherein the cover is pivotingly disposed on the base, openably and coverably, to form an appearance of a notebook computer. The socket is formed in a surface of the base for receiving a mobile communication device, and a high speed transmission interface is formed in a bottom of the socket for being electrically connected with the mobile communication device. The plurality of peripheral interface devices is disposed on the casing and electrically connected with the high speed transmission interface for transmitting signals with the mobile communication device.

The efficacy of the present invention is as follows: the present invention can ensure that mobile communication devices are convenient for operation. Basing on the present invention, users can operate mobile communication devices like computers, and they needn't keep on updating data because data are stored data separately. Furthermore, users needn't buy computers and mobile communication devices respectively, so costs are saved.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

The present invention provides a docking station with peripheral interface devices to meet users' operation demands and effectively combine with mobile communication devices so that the mobile communication devices can be used as principal arithmetic devices: Further, users can actually operate and use the mobile communication devices via the peripheral interface devices of the docking station. For preferable application effects, the following embodiments take smart phones with complete functions for examples of the mobile communication devices, and take universal serial bus 3.0 interfaces (USB 3.0), which have greater transmission frequency bandwidth and simultaneously execute information upload and information download, as high speed transmission interfaces connected between the docking station and the mobile communication devices, which is mentioned herein firstly.

Figure 1:
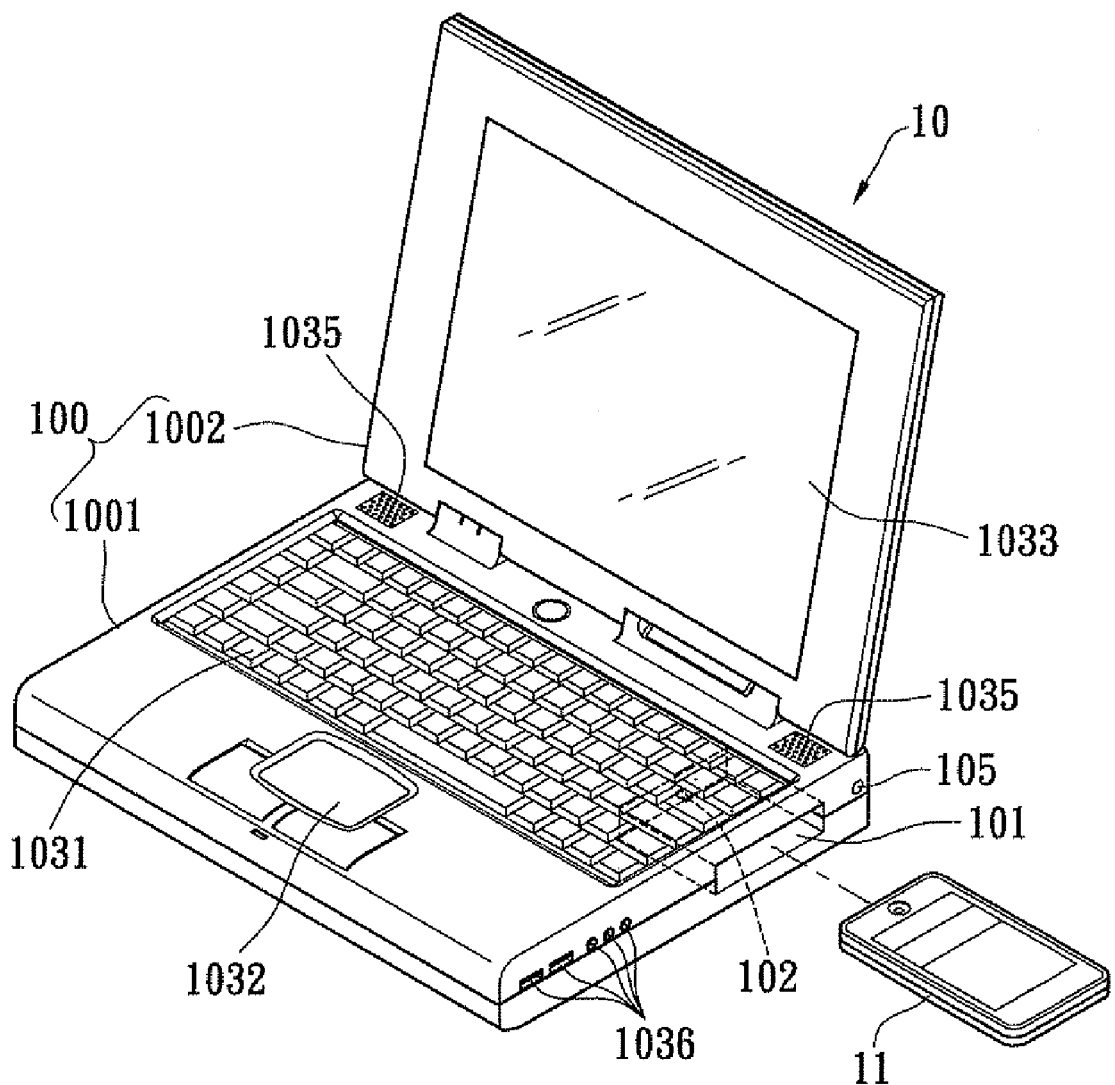
FIG. 1 is a schematic view of a first embodiment of a computer system using a docking station of the present invention.
Figure 2:
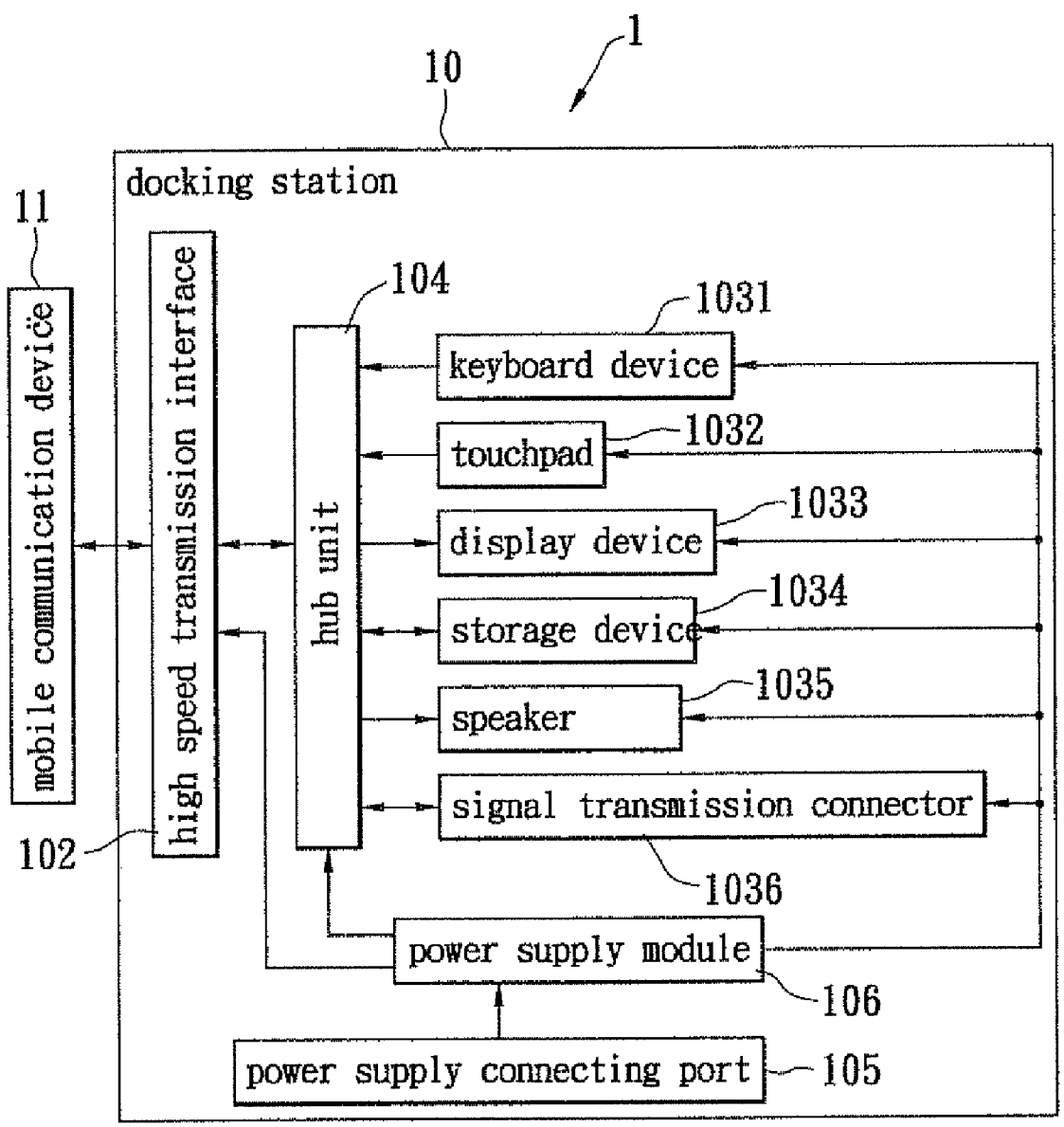
FIG. 2 is a block diagram of the first embodiment of the computer system using a docking station of the present invention.

Please refer to FIG. 1 and FIG. 2 simultaneously, illustrating a first embodiment of a computer system using a docking station of the present invention. In the first embodiment, a computer system 1 is provided, and includes a docking station 10 and a mobile communication device 11. In appearance, a casing 100 of the docking station 10 forms an appearance of a notebook computer and includes a base 1001 and a cover 1002 pivotingly disposed on the base 1001, operably and coverably.

The docking station 10 further has a socket 101 formed in a surface of the base 1001 (for example, a right side surface as shown in FIG. 1) for receiving the mobile communication device 11, and a high speed transmission interface 102 formed in the bottom of the socket 101, which may be electrically connected with the mobile communication device 11 when the mobile communication device 11 is inserted in the socket 101. For supplementary explanations, the socket 101 isn't limited in any surface of the base 1001 actually. Though not every surface is labeled in FIG. 1, those skilled in the art should know that the base 1001 mentioned in the first embodiment has an upper surface, a lower surface, a front side surface, a rear side surface, a left side surface and a right side surface. In the first embodiment, the socket is defined in the right side surface of the base 1001.

Moreover, the docking station 10 further includes a plurality of peripheral interface devices (such as a keyboard device 1031, a touchpad 1032, a display device 1033, a storage device 1034, a speaker 1035, at least one signal transmission connector 1036 and so on), a hub unit 104, a power supply connecting port 105 and a power supply module 106. The peripheral interface devices, the power supply connecting port 105 and a power supply module 106 are generally disposed in the casing 100 according to the structure of a common notebook computer.

For example, the keyboard device 1031 is disposed on the upper surface of the base 1001, adjacent to a pivoted end of the cover 1002. The touchpad 1032 is disposed on the upper surface of the base 1001, far away from the pivoted end of the cover 1002. The display device 1033 is disposed on the cover 1002. The storage device 1034 is disposed in a receiving room of the base 1001 (not shown), and the storage device 1034 may generally be assembled in the receiving room from the lower surface of the base 1001. The speaker 1035 is disposed on the upper surface of the base 1001 (as shown in FIG. 1, also adjacent to the pivoted end of the cover 1002). The signal transmission connector 1036 is disposed on one side surface of the base 1001 for connecting with an external device (not shown). The power supply connecting port 105 is also disposed on one side surface of the base 1001. The power supply module 106 is disposed in another receiving room of the base 1001 (not shown). The signal transmission connector 1036, for example, may be a universal serial bus interface connector, an express card interface connector, an audio transmission port, a video transmission port and so on. For convenient explanation, as shown in FIG. 1, the signal transmission connector 1036 and the power supply connecting port 105 are both disposed on the right side surface of the base 1001, however, in fact, the signal transmission connector 1036 and the power supply connecting port 105 may be respectively disposed on different side surfaces of the base 1001 depending on design demands, which isn't limited herein. Additionally, the functions of the above-mentioned peripheral interface devices should be known by those skilled in the art, so the detailed description is omitted.

As shown in FIG. 2, the hub unit 104 is used for connecting the high speed transmission interface 102 with the above mentioned peripheral interface devices so that the peripheral interface devices and the high speed transmission interface 102 are electrically connected to transmit signals. Concretely speaking, the hub unit 104 is electrically connected with the high speed transmission interface 102 via an upstream port (not shown) and respectively connected with the peripheral interface devices via a plurality of downstream ports (not shown). Furthermore, since the hub unit 104 is one of circuit components in the base 1001 actually, it isn't shown in FIG. 1.

The power supply connecting port 105 is electrically connected with a utility power socket (not shown) for receiving a utility power signal (such as an alternating current signal of 110 volts). The power supply module 106 is electrically connected with the power supply connecting port 105 for receiving the utility power signal and further converts the utility power signal into a supply power signal (such as a direct current signal of 5 volts) to provide for the hub unit 104, the peripheral interface devices and the high speed transmission interface 102. Of course, there may be various conversion circuits with different specifications designed in the power supply module 106 at the same time to convert the utility power signal into supply power signals with different specifications, which isn't limited herein. Moreover, the power supply module 106 further includes a storage battery (not shown) for providing a standby power signal in order that the power supply module 106 can still produce the supply power signal successfully when the utility power signal isn't provided. Further, when the mobile communication device 11 is electrically connected with the high speed transmission interface 102, the mobile communication device 11 can receive the supply power signal for being charged via the high speed transmission interface 102.

Based on the above description, the structures of the computer system 1 and the docking station 10 of the present invention can be achieved, wherein the docking station 10 only provide the appearance of the notebook computer and the related peripheral interface devices and doesn't provide any circuit or component for principal operations and processes. When users put the mobile communication device 11 in the socket 101 of the docking station 10 and electrically connect the mobile communication device 11 with the high speed transmission interface 102, the mobile communication device 1 can be used as a principal operation device and combined with the peripheral interface devices of the docking station 10 to transmit signals. So the computer system 1 is achieved.

Figure 3:
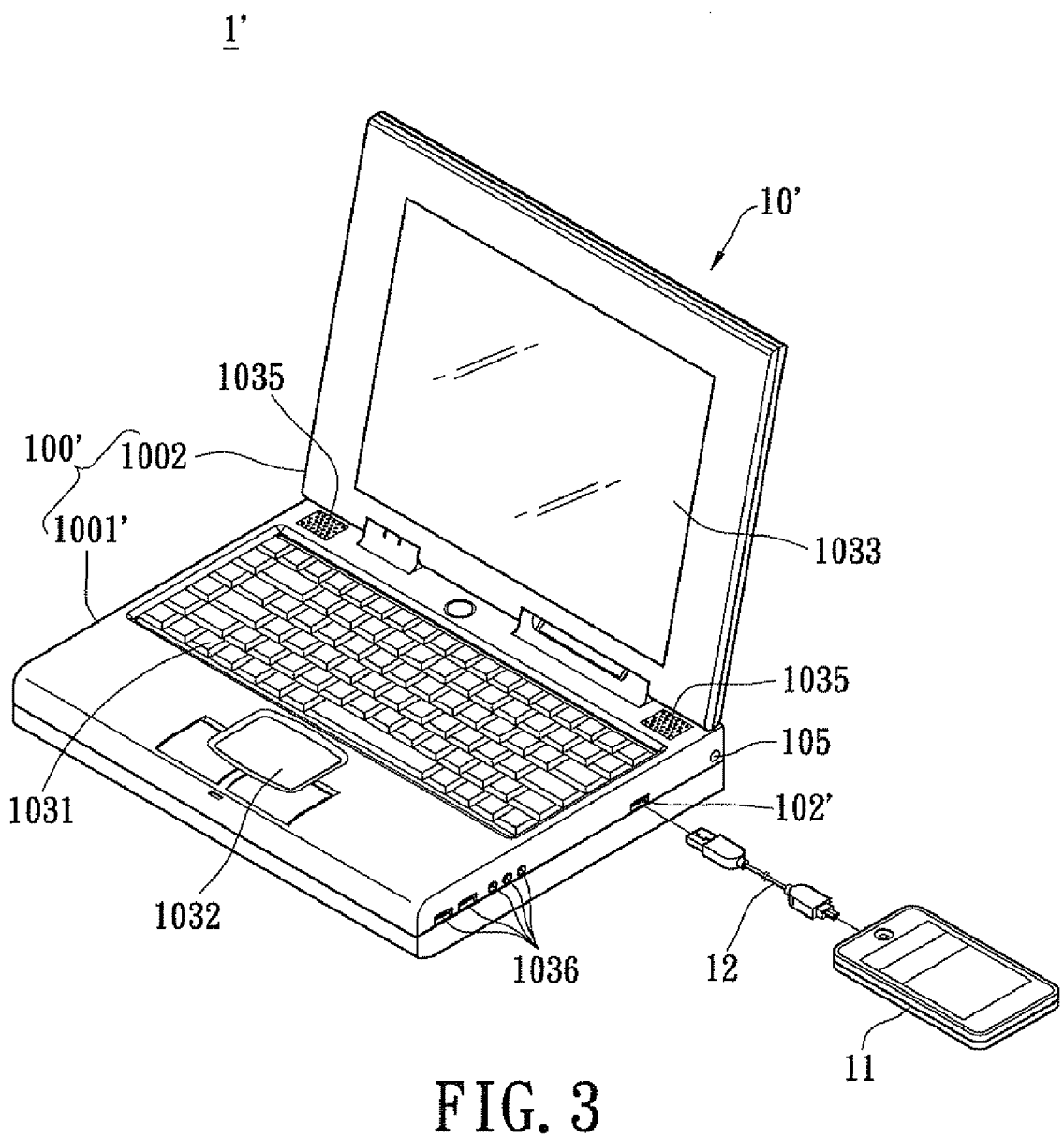
FIG. 3 is a schematic view of a second embodiment of the computer system using a docking station of the present invention.

Please refer to FIG. 3 illustrating a second embodiment of the computer system using a docking station of the present invention. The second embodiment generally has the same function and usage with the first embodiment. The only difference is that the casing 100' of the docking station 10' of the second embodiment has no socket formed in the base 1001' and directly forms the high speed transmission interface 102' in one side surface of the base 1001' (the right side surface as shown in FIG. 3). Moreover, the high speed transmission interface 102' is further connected with the mobile communication device 11 via a transmission line 12 so that the mobile communication device 11 can cooperate with the peripheral interface devices of the docking station 10' in signal transmission, thereby forming the computer system 1'.

Consequently, basing on the docking station and computer system using a docking station of the present invention, users can operate mobile communication devices like computers. Besides solving the problem that mobile communication devices are inconvenient for operation and storing data separately, the present invention can save costs, so that users needn't buy computers and mobile communication devices respectively.

What are disclosed above are only the specification and the drawings of the preferred embodiments of the present invention and it is therefore not intended that the present invention be limited to the particular embodiments disclosed. It will be understood by those skilled in the art that various equivalent changes may be made depending on the specification and the drawings of the present invention without departing from the scope of the present invention.

What is claimed is:

1. A computer system, comprising:
    a mobile communication device, being a principal operation device; and
    a docking station lacking process function, including:
        a casing, including a base and a cover, wherein the cover is connected to the base via a hinge and movable between an open position and a close position;
        a socket, formed in a surface of the base for receiving a mobile communication device, a USB 3.0 high speed transmission interface arranged in a bottom of the socket establishing signal connection with the mobile communication device;
        a hub unit, having an upstream port electrically connected with the high speed transmission interface and a plurality of downstream ports respectively electrically connected with the plurality of peripheral interface devices, wherein the plurality of peripheral interface devices is a keyboard device, a display device, a touchpad, a storage device, a speaker and at least one signal transmission connector, and wherein the touchpad is disposed on the upper surface of the base, far away from the pivoted end of the cover; the storage device is disposed in a receiving room of the base; the speaker is disposed on the upper surface of the base; and the signal transmission connector is disposed on a side surface of the base for connecting with an external device; and
        a plurality of peripheral interface devices, disposed on the casing and electrically connected to the high speed transmission interface having at least one input peripheral interface device and at least one output peripheral interface device, wherein each of the input peripheral interface device includes an input peripheral interface module adapted to generate a signal for controlling the mobile communication device, and each of the output peripheral interface device includes an output peripheral interface module adapted to receive a signal from the mobile communication device;
        wherein when the mobile communication device is coupled to the high speed transmission interface of the socket, the mobile communication device become operable as a principal operation device to control the peripheral interface devices of the docking station for transmitting signals.

2. The computer system as claimed in claim 1, further comprising:
    a power supply connecting port, disposed on a side surface of the base and electrically connected with an utility power socket for receiving an utility power signal; and
    a power supply module, disposed in a receiving room of the base and electrically connected with the power supply connecting port for receiving the utility power signal and converting the utility power signal into a supply power signal to provide for the hub unit, the plurality of peripheral interface devices and the high speed transmission interface.

3. The computer system as claimed in claim 2, wherein the mobile communication device receives the supply power signal via the high speed transmission interface.

* * * * *